United States Patent [19]
Kanayama

[11] Patent Number: 4,696,236
[45] Date of Patent: Sep. 29, 1987

[54] CONVEYOR APPARATUS

[75] Inventor: Hitoshi Kanayama, Sagamihara, Japan

[73] Assignee: Hokoku Chain Co., Ltd., Kanagawa, Japan

[21] Appl. No.: 738,226

[22] Filed: May 28, 1985

[30] Foreign Application Priority Data

Feb. 21, 1985 [JP] Japan .................................. 60-33434

[51] Int. Cl.$^4$ ............................................ B61B 13/12
[52] U.S. Cl. .................... 104/165; 198/803.01
[58] Field of Search .................. 104/18, 25, 165, 168; 198/465.1, 465.2, 803.01

[56] References Cited

U.S. PATENT DOCUMENTS

| | | | |
|---|---|---|---|
| 3,690,267 | 9/1972 | Sutton | 104/165 |
| 3,929,079 | 12/1975 | Eliassen | 104/165 X |
| 4,048,923 | 9/1977 | Giraud | 104/165 X |
| 4,078,499 | 3/1978 | Giraud | 104/165 |
| 4,114,539 | 9/1978 | Deno | 104/165 |
| 4,326,465 | 4/1982 | Forrest | 104/165 |

FOREIGN PATENT DOCUMENTS 50-95776  8/1975  Japan .
59-8604   2/1984  Japan .
612795    11/1948 United Kingdom ................ 104/165

Primary Examiner—Randolph A. Reese
Attorney, Agent, or Firm—Parkhurst & Oliff

[57] ABSTRACT

This invention relates to a conveyor apparatus which has rails laid at a predetermined interval in parallel with each other; a truck movable by means of wheels on the rails; a conveying belt moving in parallel with the rails; a unit roller mechanism mounted on the truck and having two rollers arranged longitudinally along the direction of the belt; and springs for pressing the rollers of the unit roller mechanism to the belt so that the rollers are in contact with each other; thereby operating to isolate one roller from the belt when the truck is stopped. The conveyor apparatus can thus remarkably reduce the line pressure at the accumulating time of a truck and reliably operate to readily restart the truck at the stopper releasing time, and the conveyor apparatus is inexpensive by virtue of its employment of a system for accumulating the truck without disengaging the truck from contact with the belt of a conveying strip member.

8 Claims, 6 Drawing Figures

CONVEYOR APPARATUS

BACKGROUND OF THE INVENTION

This invention relates to a conveyor apparatus and, more particularly, to an accumulation conveyor adapted to absorb an irregularity of working times in a number of working steps provided along predetermined rails by moving a truck along the rails and stopping the truck at arbitrary positions.

There are heretofore as conventional accumulation conveyors an accumulating system, as disclosed in Japanese Patent Publication No. 8604/84 official gazette, for accumulating a truck by stopping the truck by a stopper, disengaging and stopping the contact or engagement with a conveying strip member such as a belt or a chain in case of stopping the truck in contact with the preceding truck, and another accumulating system, as disclosed in Japanese Utility Model Application Laid-open No. 95,776/75 official gazette, for accumulating a truck without disengaging the contact or engagement with the conveying strip member.

In the former system for accumulating the truck by disengaging and stopping the contact or engagement with the strip member, it is necessary to separately provide a mechanism for disengaging the contact with the belt of the strip member or the engagement with the chain. Thus, the structure of the system as a conveyor apparatus becomes complicated, the truck at the accumulating time not being engaged but being held in a freely movable state. Therefore, it is necessary to provide a position restricting unit for preventing the truck from freely moving, and it has drawbacks such as an expensive cost of the entire conveyor apparatus.

In the latter system for accumulating the truck without disengaging the contact or engagement with the strip member, a line pressure as a reaction of a new engaging force such as slipping frictional force between the belt and the roller or slipping frictional force in a frictional joint with the chain wheel by the belt at the accumulating time generally increases so as to resist against the new engaging force, and it is necessary to increase the strength of the stopper and the strength of the conveying strip member such as the belt or the chain so as to resist against the reaction. Thus, if the line pressure is reduced, the engaging force should be decreased, and the engaging force of the stopper is accordingly released. Consequently, when the truck is again started, it has the drawback that slippage occurs and the truck cannot readily start.

SUMMARY OF THE INVENTION

Accordingly, it is an object of the invention to provide an improved conveyor apparatus which can eliminate all the above-described drawbacks and disadvantages of the conventional conveyor apparatuses by providing a unit roller section in a truck movable through wheels on rails, which section has two rollers always engaged with a belt moving in parallel with the rails and always pressed in planar contact with each other in such a manner that one roller shaft of the rollers is disposed in a shaft guide mounted elevationally upward or downward in the truck with the roller shaft of the adjacent roller as a rotating center.

Another object of the present invention is to provide an improved conveyor apparatus which can remarkably reduce the line pressure at the accumulating time of a truck, which can reliably operate to readily restart the truck at the stopper releasing time, and which is inexpensive by virtue of its employment of a system for accumulating the truck without disengaging the contact of the truck with the belt of a conveying strip member.

The foregoing objects and other objects as well as the characteristic features of the invention will become more fully apparent and more readily understandable by the following description and the appended claims when read in conjunction with the accompanying drawings.

DESCRIPTION OF THE PREFERRED EMBODIMENTS

An embodiment of a conveyor apparatus constructed according to the present invention will now be described in detail with reference to the accompanying drawings.

Figure 1:
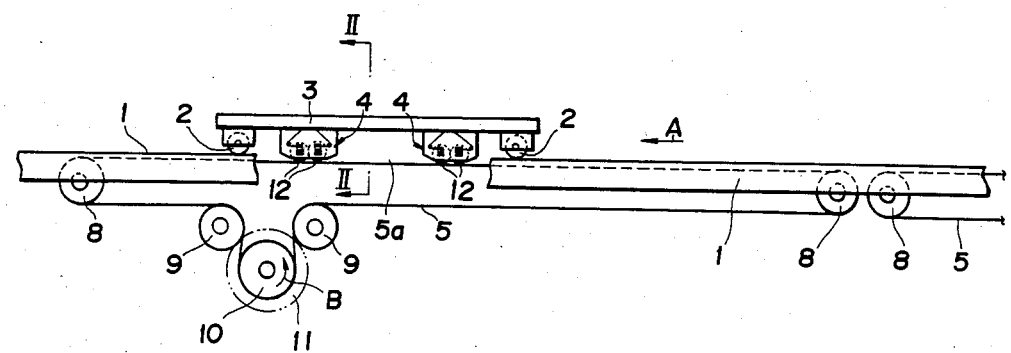
FIG. 1 is a simplified side view of an embodiment of a conveyor apparatus according to the present invention.
Figure 2:
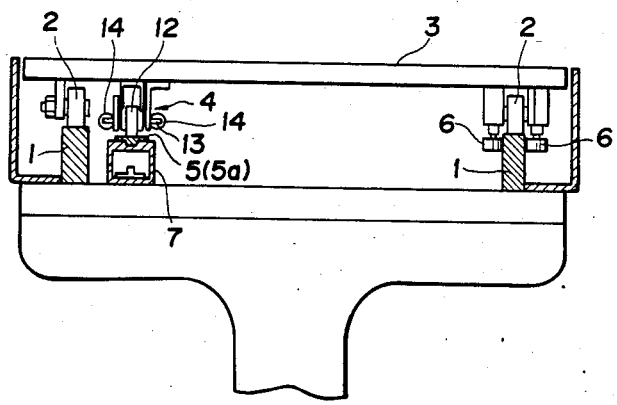
FIG. 2 is an enlarged sectional view, taken along the line II—II of FIG. 1.

As shown in FIGS. 1 and 2, unit roller sections 4 are provided in a truck 3 which is movable via wheels 2 on rails 1 laid at a suitable interval, and sections 4 are always engaged in contact with a belt 5 of a conveying strip member which moves in parallel with the rails 1 in a direction of arrow A.

As particularly shown in FIG. 2, the truck 3 is constructed to move by interposing one rail 1 between guide rollers 6 rotatably provided at both sides of one wheel 2.

The belt 5 is constructed in an endless structure in parallel with the rails 1. An upper contacting portion 5a in contact with rollers 12 of unit roller sections 4 is moved in parallel with the rails 1 under the guidance of a belt retaining rail 7 as specifically shown in FIG. 2. The belt 5 is extended between end pulleys 8, and is engaged with tension pulleys 9 and a drive pulley 10.

When the drive pulley 10 is driven by a prime mover 11 in a direction of arrow B, the belt 5 is moved in a direction of arrow A.

Figure 3:
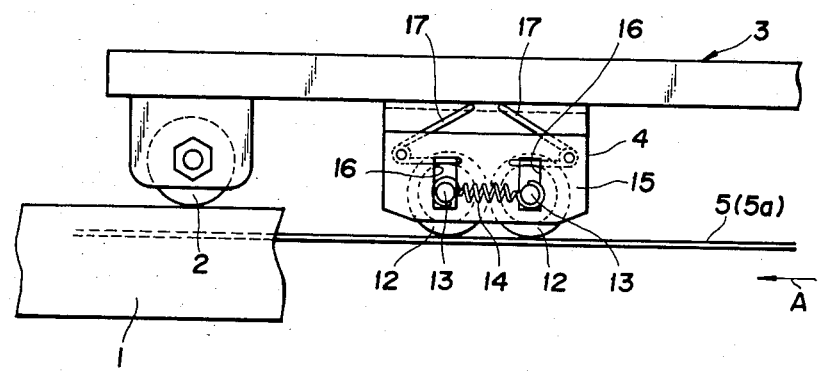
FIG. 3 is an enlarged partial side view showing a unit roller section of the conveyor apparatus of the invention.

As shown in FIG. 3, each unit roller section 4 has two rollers 12 which are planarly contacted with each other by the tension of a spring 14 extended between roller shafts 13, and which are contacted under pressure with the contacting portion 5a of the belt 5 by the tension of springs 17 disposed between the lower surface of the truck 3 and the top end faces of the rollers.

Figure 6:
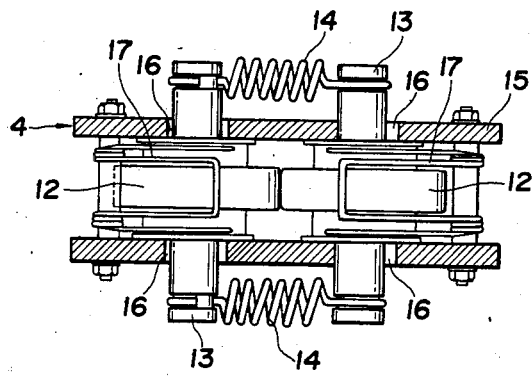
FIG. 6 is a sectional view, taken along the line VI—VI in FIG. 4.

In the construction of the unit roller section described above, the rollers 12 do not rotate on the belt 5, and the truck 3 can accordingly move on the belt 5 in a direction of arrow A as the belt 5 moves. The rollers 12 are rotatably supported by roller shafts 13, which are pressed, as shown in FIGS. 3 and 6, by the spring 14 so as to cause planar contact between adjacent rollers 12.

Each roller shaft 13 is slidably inserted into a long slot 16 perforated vertically in a shaft holder plate 15 engaged with the truck 3. As described above, the rollers 12 are always pressed by the tension of springs 17 so as to contact with the belt 5.

Figure 4:
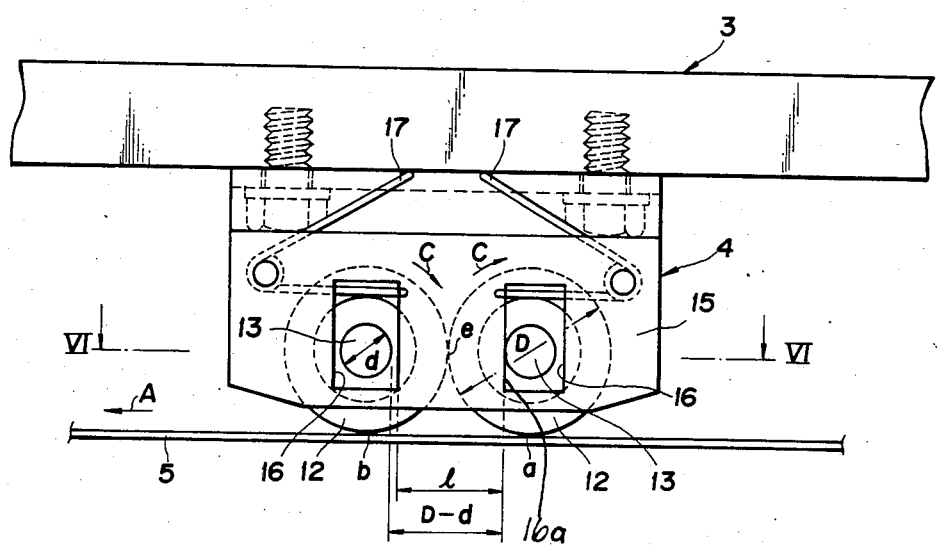
FIG. 4 is a partial side view of the unit roller section when a truck is moving.

Each roller shaft 13 of the rollers 12 is elevationally movable in the slot 16 and is held in a relation as designated by the following formula:

$$D-d>l$$

where D represents the diameter of the roller 12, d represents the outer diameter of the roller shaft 13 inserted into the slot 16, and l represents an internal normal interval of both slots 16 as shown in FIG. 4.

The operation of the conveyor apparatus of the present invention constructed as described above will now be described.

FIG. 4 shows the relationship of the positions of the rollers 12 of the unit roller section 4 when the truck 3 moves. In FIG. 4, the spring 14 between the roller shafts 13 is omitted for simplicity of illustration.

Assuming that the belt 5 now moves in a direction of arrow A, the rollers 12 contact with the belt 5 at the points a and b since the rollers 12 are contacted under pressure through the tension of spring 17 with the belt 5, and rollers 12 tend to be rotated in a direction of arrows C.

Further, rollers 12 are pressed by the spring 14, and contacted with each other on the outer peripheral surfaces thereof at a point é, and both rollers 12 thus tend to rotate clockwise as depicted by arrows C. Thus, the adjacent contacting surfaces of rollers 12 tend to move in opposite directions at the contacting point e, with the result that the rotations of rollers 12 suppress each other. Thus, rollers 12 do not readily rotate, but rollers 12 are contacted under pressure with the belt 5 at the contacting points a and b, and the contacting point e with each other, totally at three points, and the rollers 12 are not accordingly rotated, and the truck 3 moves on the belt 5 when the belt 5 moves.

Figure 5:
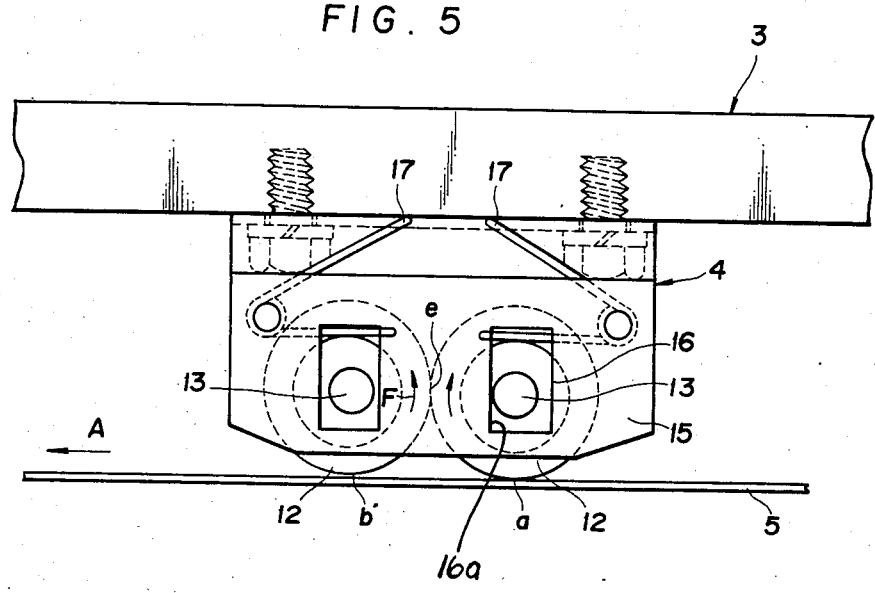
FIG. 5 is a partial side view of the unit roller section when a truck is stopped.

The operation of the unit roller section 4 when the truck 3 is stopped by the stopper (not shown) or preceding truck will be described with reference to FIG. 5. In FIG. 5, the spring 14 is omitted for simplicity of illustration.

Assuming now that belt 5 is moved in a direction of arrow A and the truck 3 is stopped by the stopper, the shaft holder plate 15 is also stopped, and since the rollers 12 are pressed to each other by the tension of spring 14 in a planarly contacting fashion, rollers 12 do not move while maintaining the planar contact with each other, but roller shafts 13 of rollers 12 are pressed toward a direction of arrow A in the slots 16, i.e., the roller shaft at the rear with respect to the belt moving direction is pressed in contact with the wall 16a of the front side of the slot 16, and the preceding roller shaft is moved to the position to be movably engaged within the slot 16.

The positional relationship of the roller shafts 13 is determined according to the relationship of D−d>l.

The rollers 12 are contacted on the belt 5 by the pressure contacting force of the spring 17 to the belt 5 while planarly contacting with each other by the tension of spring 14 at this position, but a force for raising the rollers in a direction of arrow F is applied to the front roller 12 with respect to the moving direction, i.e., the left roller 12 shown in FIG. 5, at the contacting point e of rollers 12 by a pressure contacting force between rollers 12 by the tension of the spring 14, a frictional resistance between rollers 12 and the belt 5 by the tension of the spring 17, and by the rotation of the back roller 12 with respect to the moving direction (right roller 12 of FIG. 5).

As a result, the front roller 12 (left roller 12 of FIG. 5) is separated from the belt 5 as shown by b' due to the remarkable reduction in the pressure contacting force of the spring 17 to the belt 5. Thus, both rollers 12 rotate in response to the movement of the belt 5. The line pressure at this time becomes the value produced by multiplying the combination of the pressure contacting force between the rollers 12 and the belt 5 by the spring 17 and the pressure contacting force between the rollers 12 by the spring 14 by a rolling coefficient of the rollers 12, thereby remarkably reducing the line pressure at the accumulating time to the truck 3.

In the above case, the tensions of the springs 14, 17 are set to a value for operating the conveyor apparatus of the invention as described above.

When the stopping force of the stopper to the truck 3 is released, the rollers 12 are immediately planarly contacted with the upper surface 5a of the belt 5 by the pressing force of the tension of spring 17, and the state as shown in FIG. 4 is achieved, with the result that both rollers 12 are stopped, and the truck 3 can be readily restarted by following the movement of belt 5. The operation of the rollers 12 of the unit roller section is conducted in the same manner even if the moving direction of the belt is reversed.

It is noted that each truck may be provided with only one unit roller section 14, but a plurality of unit roller sections 14 provided in one truck as shown in FIG. 1 provide for ready and reliable continuous transfer of the truck from the preceding conveyor to the next conveyor.

According to the present invention as described above, the unit roller section having two rollers engaged with the belt is provided in the truck, the truck is moved together with the belt without rolling the rollers by always pressing the rollers in planar contact with each other when the truck is moved, and the front roller with respect to the moving direction is separated from the belt when the truck is stopped, thereby remarkably reducing the line pressure to be applied to the conveyor at the accumulating time of the truck. Thus, the conveyor apparatus has a simple structure, can reliably stop and restart the truck, and provides extremely small necessary operating force.

What is claimed is:

1. A conveyor apparatus comprising:
   rails laid at a predetermined interval in parallel with each other;
   a truck movable by means of wheels on said rails;
   a conveying belt moving in parallel with said rails;
   a unit roller mechanism mounted on said truck and having two rollers rotatably supported on roller shafts and arranged longitudinally along the direction of said belt, said roller shafts being slidably inserted into two long slots of a holder plate which is mounted on said truck and which supports the roller shafts; and
   means for pressing the rollers of said unit roller mechanism to said belt and in contact with each other;
   whereby when the truck is stopped while the conveying belt continues to move, one of said rollers is caused to rotate, thereby causing the other roller to become separated from the conveying belt.

2. The conveyor apparatus according to claim 1, wherein said pressing means comprises a first spring and a second spring.

3. The conveyor apparatus according to claim 2, wherein said rollers are pressed by the first spring into contact under pressure with the belt.

4. The conveyor apparatus according to claim 2, wherein said first spring is disposed between the lower surface of said truck and the rollers, and said second spring is extended between the roller shafts of the rollers.

5. The conveyor apparatus according to claim 2, wherein said first and second springs are of an elastic force capable of separating the one roller from the belt when said truck is stopped.

6. The conveyor apparatus according to claim 1, wherein an inner normal interval of the two long slots is set to a value smaller than the difference between the diameter of each roller and the outer diameter of each roller shaft.

7. The conveyor apparatus according to claim 1, wherein guide rollers are rotatably provided at both sides of one of said wheels, and further wherein one of said rails is interposed between said guide rollers.

8. The conveyor apparatus according to claim 1, wherein guide rollers are rotatably provided at both sides of each said wheel, and further wherein each said rail is interposed between the guide rollers of the wheel which is in contact with said rail.

* * * * *